(12) United States Patent
Kato et al.

(10) Patent No.: US 8,960,900 B2
(45) Date of Patent: Feb. 24, 2015

(54) PROGRESSIVE-POWER LENS

(75) Inventors: Kazutoshi Kato, Kamiina-gun (JP);
Yohei Suzuki, Kamiina-gun (JP);
Ayumu Ito, Kamiina-gun (JP);
Toshihide Shinohara, Chino (JP);
Tadashi Kaga, Kamiina-gun (JP)

(73) Assignee: Hoya Lens Manufacturing Philippines Inc., Cavite (PH)

( * ) Notice: Subject to any disclaimer, the term of this patent is extended or adjusted under 35 U.S.C. 154(b) by 396 days.

(21) Appl. No.: 13/414,260

(22) Filed: Mar. 7, 2012

(65) Prior Publication Data

US 2012/0229756 A1 Sep. 13, 2012

(30) Foreign Application Priority Data

Mar. 8, 2011 (JP) ................. 2011-050202

(51) Int. Cl.
*G02C 7/06* (2006.01)
(52) U.S. Cl.
CPC .............. *G02C 7/068* (2013.01); *G02C 7/063* (2013.01)
USPC .................................. 351/159.42
(58) Field of Classification Search
CPC ........ G02C 7/061; G02C 7/063; G02C 7/065; G02C 7/066; G02C 7/068
USPC ...................... 351/159.42, 159.06
See application file for complete search history.

(56) References Cited

U.S. PATENT DOCUMENTS

| | | | |
|---|---|---|---|
| 5,926,250 A | 7/1999 | Mukaiyama et al. | 351/168 |
| 6,019,470 A | 2/2000 | Mukaiyama et al. | 351/169 |
| 6,139,148 A | 10/2000 | Menezes | |
| 6,935,744 B2 * | 8/2005 | Kitani et al. | 351/159.42 |
| 7,159,980 B2 | 1/2007 | Kato | 351/168 |
| 7,241,010 B2 * | 7/2007 | Kitani et al. | 351/159.06 |
| 7,731,357 B2 * | 6/2010 | Kitani et al. | 351/159.42 |
| 2004/0233385 A1 | 11/2004 | Kitani et al. | |
| 2009/0109396 A1 | 4/2009 | Kitani et al. | |
| 2010/0245763 A1 | 9/2010 | Shinohara et al. | |
| 2012/0229755 A1 * | 9/2012 | Kato et al. | 351/159.42 |

FOREIGN PATENT DOCUMENTS

| | | |
|---|---|---|
| EP | 1026533 A2 | 8/2000 |
| EP | 1906227 A1 | 4/2008 |
| EP | 1990676 A2 | 11/2008 |
| JP | 3582527 | 8/2004 |
| JP | 3800629 | 5/2006 |

(Continued)

OTHER PUBLICATIONS

Extended European search report dated Jul. 2, 2012 issued in corresponding European application 12158231.6 cites the foreign patent documents listed above.

(Continued)

*Primary Examiner* — Zachary Wilkes
(74) *Attorney, Agent, or Firm* — DLA Piper LLP (US)

(57) ABSTRACT

A progressive-power lens has one surface which satisfies the following expressions $$CY(DP)=CT(DP)$$

$$CY(P)>CT(P)$$

where CT(DP) denotes a vertical direction curvature at the distance reference point, CY(DP) denotes a horizontal direction curvature, CY(P) denotes a horizontal direction curvature at a point on the principal meridian which is located further on the near portion than the progressive start point, and CT(P) denotes a vertical direction curvature at the point.

4 Claims, 7 Drawing Sheets

(56) References Cited

FOREIGN PATENT DOCUMENTS

| | | | |
|---|---|---|---|
| JP | 2010237403 A | | 10/2010 |
| JP | 2012173595 A | * | 9/2012 |

OTHER PUBLICATIONS

European office action dated Sep. 3, 2013 issued in corresponding European application 12158231.6.

* cited by examiner

| | | OBJECT-SIDE REFRACTIVE SURFACE | | | | EYEBALL-SIDE REFRACTIVE SURFACE | | | |
|---|---|---|---|---|---|---|---|---|---|
| | POSITION FROM GEOMETRIC CENTER (mm) | VERTICAL POWER (D) | HORIZONTAL POWER (D) | VERTICAL CURVATURE (1/m) | HORIZONTAL CURVATURE (1/m) | VERTICAL POWER (D) | HORIZONTAL POWER (D) | VERTICAL CURVATURE (1/m) | HORIZONTAL CURVATURE (1/m) |
| | 10 | 2.50 | 2.50 | 3.776 | 3.776 | 6.50 | 6.50 | 9.819 | 9.819 |
| | 8 | 2.50 | 2.50 | 3.776 | 3.776 | 6.50 | 6.50 | 9.819 | 9.819 |
| DISTANCE DIOPTRIC POWER MEASUREMENT POSITION (D) | 6 | 2.50 | 2.50 | 3.776 | 3.776 | 6.50 | 6.50 | 9.819 | 9.819 |
| | 4 | 2.50 | 2.50 | 3.776 | 3.776 | 6.50 | 6.50 | 9.819 | 9.819 |
| PROGRESSIVE START POINT | 2 | 2.50 | 2.50 | 3.776 | 3.776 | 6.50 | 6.50 | 9.819 | 9.819 |
| GEOMETRIC CENTER | 0 | 3.00 | 3.14 | 4.532 | 4.748 | 6.71 | 6.86 | 10.142 | 10.358 |
| | -2 | 3.50 | 3.79 | 5.287 | 5.719 | 6.93 | 7.21 | 10.466 | 10.898 |
| | -4 | 4.00 | 4.43 | 6.042 | 6.690 | 7.14 | 7.57 | 10.790 | 11.437 |
| | -6 | 4.50 | 5.07 | 6.798 | 7.661 | 7.36 | 7.93 | 11.114 | 11.977 |
| | -8 | 5.00 | 5.71 | 7.553 | 8.632 | 7.57 | 8.29 | 11.437 | 12.516 |
| | -10 | 5.50 | 6.36 | 8.308 | 9.603 | 7.79 | 8.64 | 11.761 | 13.056 |
| | -12 | 6.00 | 7.00 | 9.063 | 10.574 | 8.00 | 9.00 | 12.085 | 13.595 |
| NEAR DIOPTRIC POWER MEASUREMENT POSITION (N) | -14 | 6.00 | 7.00 | 9.063 | 10.574 | 8.00 | 9.00 | 12.085 | 13.595 |
| | -16 | 6.00 | 7.00 | 9.063 | 10.574 | 8.00 | 9.00 | 12.085 | 13.595 |
| | -18 | 6.00 | 7.00 | 9.063 | 10.574 | 8.00 | 9.00 | 12.085 | 13.595 |
| | -20 | 6.00 | 7.00 | 9.063 | 10.574 | 8.00 | 9.00 | 12.085 | 13.595 |

FIG. 4

|  | POSITION FROM GEOMETRIC CENTER (mm) | OBJECT-SIDE REFRACTIVE SURFACE ||||  EYEBALL-SIDE REFRACTIVE SURFACE ||||
|---|---|---|---|---|---|---|---|---|---|
|  |  | VERTICAL POWER (D) | HORIZONTAL POWER (D) | VERTICAL CURVATURE (1/m) | HORIZONTAL CURVATURE (1/m) | VERTICAL POWER (D) | HORIZONTAL POWER (D) | VERTICAL CURVATURE (1/m) | HORIZONTAL CURVATURE (1/m) |
|  | 10 | 4.00 | 4.00 | 6.667 | 6.667 | 6.00 | 6.00 | 10.000 | 10.000 |
|  | 8 | 4.00 | 4.00 | 6.667 | 6.667 | 6.00 | 6.00 | 10.000 | 10.000 |
| DISTANCE DIOPTRIC POWER MEASUREMENT POSITION (D) | 6 | 4.00 | 4.00 | 6.667 | 6.667 | 6.00 | 6.00 | 10.000 | 10.000 |
|  | 4 | 4.00 | 4.00 | 6.667 | 6.667 | 6.00 | 6.00 | 10.000 | 10.000 |
| PROGRESSIVE START POINT | 2 | 4.00 | 4.00 | 6.667 | 6.667 | 6.00 | 6.00 | 10.000 | 10.000 |
| GEOMETRIC CENTER | 0 | 4.50 | 4.64 | 7.500 | 7.738 | 6.21 | 6.36 | 10.357 | 10.595 |
|  | -2 | 5.00 | 5.29 | 8.333 | 8.810 | 6.43 | 6.71 | 10.714 | 11.190 |
|  | -4 | 5.50 | 5.93 | 9.167 | 9.881 | 6.64 | 7.07 | 11.071 | 11.786 |
|  | -6 | 6.00 | 6.57 | 10.000 | 10.952 | 6.86 | 7.43 | 11.429 | 12.381 |
|  | -8 | 6.50 | 7.21 | 10.833 | 12.024 | 7.07 | 7.79 | 11.786 | 12.976 |
|  | -10 | 7.00 | 7.86 | 11.667 | 13.095 | 7.29 | 8.14 | 12.143 | 13.571 |
|  | -12 | 7.50 | 8.50 | 12.500 | 14.167 | 7.50 | 8.50 | 12.500 | 14.167 |
| NEAR DIOPTRIC POWER MEASUREMENT POSITION (N) | -14 | 7.50 | 8.50 | 12.500 | 14.167 | 7.50 | 8.50 | 12.500 | 14.167 |
|  | -16 | 7.50 | 8.50 | 12.500 | 14.167 | 7.50 | 8.50 | 12.500 | 14.167 |
|  | -18 | 7.50 | 8.50 | 12.500 | 14.167 | 7.50 | 8.50 | 12.500 | 14.167 |
|  | -20 | 7.50 | 8.50 | 12.500 | 14.167 | 7.50 | 8.50 | 12.500 | 14.167 |

FIG. 5

|  | POSITION FROM GEOMETRIC CENTER (mm) | OBJECT-SIDE REFRACTIVE SURFACE | | | | EYEBALL-SIDE REFRACTIVE SURFACE | | | |
|---|---|---|---|---|---|---|---|---|---|
|  |  | VERTICAL POWER (D) | HORIZONTAL POWER (D) | VERTICAL CURVATURE (1/m) | HORIZONTAL CURVATURE (1/m) | VERTICAL POWER (D) | HORIZONTAL POWER (D) | VERTICAL CURVATURE (1/m) | HORIZONTAL CURVATURE (1/m) |
|  | 10 | 1.00 | 1.00 | 1.351 | 1.351 | 7.00 | 7.00 | 9.459 | 9.459 |
|  | 8 | 1.00 | 1.00 | 1.351 | 1.351 | 7.00 | 7.00 | 9.459 | 9.459 |
| DISTANCE DIOPTRIC POWER MEASUREMENT POSITION (D) | 6 | 1.00 | 1.00 | 1.351 | 1.351 | 7.00 | 7.00 | 9.459 | 9.459 |
|  | 4 | 1.00 | 1.00 | 1.351 | 1.351 | 7.00 | 7.00 | 9.459 | 9.459 |
| PROGRESSIVE START POINT | 2 | 1.00 | 1.00 | 1.351 | 1.351 | 7.00 | 7.00 | 9.459 | 9.459 |
| GEOMETRIC CENTER | 0 | 1.64 | 1.86 | 2.220 | 2.510 | 7.21 | 7.43 | 9.749 | 10.039 |
|  | -2 | 2.29 | 2.71 | 3.089 | 3.668 | 7.43 | 7.86 | 10.039 | 10.618 |
|  | -4 | 2.93 | 3.57 | 3.958 | 4.826 | 7.64 | 8.29 | 10.328 | 11.197 |
|  | -6 | 3.57 | 4.43 | 4.826 | 5.985 | 7.86 | 8.71 | 10.618 | 11.776 |
|  | -8 | 4.21 | 5.29 | 5.695 | 7.143 | 8.07 | 9.14 | 10.907 | 12.355 |
|  | -10 | 4.86 | 6.14 | 6.564 | 8.301 | 8.29 | 9.57 | 11.197 | 12.934 |
|  | -12 | 5.50 | 7.00 | 7.432 | 9.459 | 8.50 | 10.00 | 11.486 | 13.514 |
| NEAR DIOPTRIC POWER MEASUREMENT POSITION (N) | -14 | 5.50 | 7.00 | 7.432 | 9.459 | 8.50 | 10.00 | 11.486 | 13.514 |
|  | -16 | 5.50 | 7.00 | 7.432 | 9.459 | 8.50 | 10.00 | 11.486 | 13.514 |
|  | -18 | 5.50 | 7.00 | 7.432 | 9.459 | 8.50 | 10.00 | 11.486 | 13.514 |
|  | -20 | 5.50 | 7.00 | 7.432 | 9.459 | 8.50 | 10.00 | 11.486 | 13.514 |

FIG. 6

| | | OBJECT-SIDE REFRACTIVE SURFACE | | | | EYEBALL-SIDE REFRACTIVE SURFACE | | | |
|---|---|---|---|---|---|---|---|---|---|
| | POSITION FROM GEOMETRIC CENTER (mm) | VERTICAL POWER (D) | HORIZONTAL POWER (D) | VERTICAL CURVATURE (1/m) | HORIZONTAL CURVATURE (1/m) | VERTICAL POWER (D) | HORIZONTAL POWER (D) | VERTICAL CURVATURE (1/m) | HORIZONTAL CURVATURE (1/m) |
| | 10 | 0.50 | 0.50 | 1.000 | 1.000 | 10.50 | 10.50 | 21.000 | 21.000 |
| DISTANCE DIOPTRIC POWER MEASUREMENT POSITION (D) | 8 | 0.50 | 0.50 | 1.000 | 1.000 | 10.50 | 10.50 | 21.000 | 21.000 |
| | 6 | 0.50 | 0.50 | 1.000 | 1.000 | 10.50 | 10.50 | 21.000 | 21.000 |
| | 4 | 0.50 | 0.50 | 1.000 | 1.000 | 10.50 | 10.50 | 21.000 | 21.000 |
| PROGRESSIVE START POINT | 2 | 0.50 | 0.50 | 1.000 | 1.000 | 10.50 | 10.50 | 21.000 | 21.000 |
| GEOMETRIC CENTER | 0 | 0.93 | 1.21 | 1.857 | 2.429 | 10.57 | 10.86 | 21.143 | 21.714 |
| | -2 | 1.36 | 1.93 | 2.714 | 3.857 | 10.64 | 11.21 | 21.286 | 22.429 |
| | -4 | 1.79 | 2.64 | 3.571 | 5.286 | 10.71 | 11.57 | 21.429 | 23.143 |
| | -6 | 2.21 | 3.36 | 4.429 | 6.714 | 10.79 | 11.93 | 21.571 | 23.857 |
| | -8 | 2.64 | 4.07 | 5.286 | 8.143 | 10.86 | 12.29 | 21.714 | 24.571 |
| | -10 | 3.07 | 4.79 | 6.143 | 9.571 | 10.93 | 12.64 | 21.857 | 25.286 |
| | -12 | 3.50 | 5.50 | 7.000 | 11.000 | 11.00 | 13.00 | 22.000 | 26.000 |
| NEAR DIOPTRIC POWER MEASUREMENT POSITION (N) | -14 | 3.50 | 5.50 | 7.000 | 11.000 | 11.00 | 13.00 | 22.000 | 26.000 |
| | -16 | 3.50 | 5.50 | 7.000 | 11.000 | 11.00 | 13.00 | 22.000 | 26.000 |
| | -18 | 3.50 | 5.50 | 7.000 | 11.000 | 11.00 | 13.00 | 22.000 | 26.000 |
| | -20 | 3.50 | 5.50 | 7.000 | 11.000 | 11.00 | 13.00 | 22.000 | 26.000 |

FIG. 7

| | | OBJECT-SIDE REFRACTIVE SURFACE | | | | EYEBALL-SIDE REFRACTIVE SURFACE | | | |
|---|---|---|---|---|---|---|---|---|---|
| | POSITION FROM GEOMETRIC CENTER (mm) | VERTICAL POWER (D) | HORIZONTAL POWER (D) | VERTICAL CURVATURE (1/m) | HORIZONTAL CURVATURE (1/m) | VERTICAL POWER (D) | HORIZONTAL POWER (D) | VERTICAL CURVATURE (1/m) | HORIZONTAL CURVATURE (1/m) |
| | 10 | 3.00 | 3.00 | 5.172 | 5.172 | 6.00 | 6.00 | 10.345 | 10.345 |
| | 8 | 3.00 | 3.00 | 5.172 | 5.172 | 6.00 | 6.00 | 10.345 | 10.345 |
| DISTANCE DIOPTRIC POWER MEASUREMENT POSITION (D) | 6 | 3.00 | 3.00 | 5.172 | 5.172 | 6.00 | 6.00 | 10.345 | 10.345 |
| | 4 | 3.00 | 3.00 | 5.172 | 5.172 | 6.00 | 6.00 | 10.345 | 10.345 |
| PROGRESSIVE START POINT | 2 | 3.00 | 3.00 | 5.172 | 5.172 | 6.00 | 6.00 | 10.345 | 10.345 |
| GEOMETRIC CENTER | 0 | 3.21 | 3.29 | 5.542 | 5.665 | 6.07 | 6.14 | 10.468 | 10.591 |
| | -2 | 3.43 | 3.57 | 5.911 | 6.158 | 6.14 | 6.29 | 10.591 | 10.837 |
| | -4 | 3.64 | 3.86 | 6.281 | 6.650 | 6.21 | 6.43 | 10.714 | 11.084 |
| | -6 | 3.86 | 4.14 | 6.650 | 7.143 | 6.29 | 6.57 | 10.837 | 11.330 |
| | -8 | 4.07 | 4.43 | 7.020 | 7.635 | 6.36 | 6.71 | 10.961 | 11.576 |
| | -10 | 4.29 | 4.71 | 7.389 | 8.128 | 6.43 | 6.86 | 11.084 | 11.823 |
| | -12 | 4.50 | 5.00 | 7.759 | 8.621 | 6.50 | 7.00 | 11.207 | 12.069 |
| NEAR DIOPTRIC POWER MEASUREMENT POSITION (N) | -14 | 4.50 | 5.00 | 7.759 | 8.621 | 6.50 | 7.00 | 11.207 | 12.069 |
| | -16 | 4.50 | 5.00 | 7.759 | 8.621 | 6.50 | 7.00 | 11.207 | 12.069 |
| | -18 | 4.50 | 5.00 | 7.759 | 8.621 | 6.50 | 7.00 | 11.207 | 12.069 |
| | -20 | 4.50 | 5.00 | 7.759 | 8.621 | 6.50 | 7.00 | 11.207 | 12.069 |

FIG. 8

PROGRESSIVE-POWER LENS

This application claims priority to Japanese Patent Application No. 2011-050202, filed Mar. 8, 2011, the entirety of which is hereby incorporated by reference.

BACKGROUND

1. Technical Field

The present invention relates to a progressive-power lens.

2. Related Art

A progressive-power lens includes a distance portion having the power (dioptric power) corresponding to distance vision, a near portion having the power corresponding to near vision, a progressive portion provided between the distance portion and the near portion, and an intermediate lateral portion provided on both sides of the progressive portion. A difference between the power of the distance portion and the power of the near portion is referred to as an addition power (Add), and, as the addition power becomes larger, discomfort such as fluctuation, distortion, and blurring is increased. In addition, when the progressive-power lens is fitted, adjustment is typically performed such that optical performance in the distance portion becomes the best, and thus a position of the near portion is necessarily set. Therefore, optimal fitting in the near portion may not be performed independently. When such a progressive-power lens is actually worn, the eye-perceived near dioptric power is different from the lens dioptric power, and thus fluctuation or distortion is worsened.

There have been proposed techniques for suppressing such discomfort (for example, refer to Japanese Patent No. 3582527). A progressive-power lens disclosed in Japanese Patent No. 3582527 includes an object-side surface and an eye-ball side surface, wherein when an average curvature of the eyeball-side surface around the distance portion is used as a reference spherical surface, an average curvature of the eyeball-side surface around the near portion is changed such that the eyeball-side surface around the near portion is located closer to an eyeball side than the reference spherical surface.

When the progressive-power lens disclosed in Japanese Patent No. 3582527 is actually worn, the problems such as image distortion or fluctuation can be reduced to some degree, but it is not sufficiently satisfactory, and further reduction is necessary.

Particularly, in a progressive-power lens of the negative dioptric power, there is a problem in that there is an occurrence of distortion where an image looks long in the vertical direction in the regions from the progressive portion to the near portion.

SUMMARY

An advantage of some aspects of the invention is to provide a progressive-power lens which can reduce distortion.

An aspect of the invention is directed to a progressive-power lens including an object-side surface; and an eyeball-side surface, wherein any one surface of the object-side surface and the eyeball-side surface includes a distance portion having a distance reference point; a near portion having a near reference point; a progressive portion having a progressive start point provided at an end part of the distance portion side, the progressive portion being provided between the distance portion and the near portion; and a principal meridian passing through the distance reference point, the near reference point, and the progressive start point, and wherein the one surface satisfies the following expressions (1) to (3)

$$(n-1) \times (CT(NP) - CT(DP)) > \text{Add} \quad (1)$$

$$CY(DP) = CT(DP) \quad (2)$$

$$CY(P) > CT(P) \quad (3)$$

where n denotes a refractive index of the progressive-power lens, Add denotes an addition power of the progressive-power lens, CT(DP) denotes a vertical direction curvature at the distance reference point, CT(NP) denotes a vertical direction curvature at the near reference point, CY(DP) denotes a horizontal direction curvature at the distance reference point, CY(P) denotes a horizontal direction curvature at a point on the principal meridian which is located further towards the near portion than the progressive start point, and CT(P) denotes a vertical direction curvature at the point.

Here, the addition power Add of the progressive-power lens is an addition power set by the prescription (hereinafter, referred to as a prescription addition power Add in some cases).

The progressive-power lens in the aspect satisfies the above-described expression (1). In the expression (1), $(n-1) \times CT(NP)$ denotes the surface power of the near portion, and $(n-1) \times CT(DP)$ denotes the surface power of the distance portion. A value obtained by subtracting $(n-1) \times CT(DP)$ from $(n-1) \times CT(NP)$ is an addition power of the lens. In a case where the progressive surface is formed only on one surface of the object-side surface and the eyeball-side surface forming the progressive-power lens, the surface power is adjusted such that the value is the same as the prescription addition power Add set by the prescription. The expression (1) means that, in one surface, the addition power set depending on the surface power is set to be larger than the prescription addition power Add set by the prescription. In other words, the surface power is adjusted that the one surface has a positive addition power, and the surface power is adjusted such that the other surface has a negative addition power, thereby obtaining a desired addition power. In other words, the progressive-power lens according to the aspect is a double-sided progressive-power lens having the progressive surface on both the surfaces of the object-side surface and the eyeball-side surface.

In the progressive-power lens, since the eyeball-side surface has the negative addition power, if the spherical surface in the distance portion of the eyeball-side surface is used as a reference surface, the near portion of the eyeball-side surface has a shape which is located further on the eyeball side than the reference surface. With this shape, since the near portion is close to the eyeball, it is difficult to perceive fluctuation. In other words, it is possible to reduce the fluctuation.

In addition, in the progressive-power lens, there are cases where an image is not distorted in the distance portion, but the image viewed via the progressive portion and the near portion is distorted, and, for example, the image looks distorted so as to be long in the vertical direction in the progressive portion and the near portion. In the aspect, the vertical direction and horizontal direction curvatures are the same as each other as shown in the expression (2) in the distance portion on the principal meridian of the progressive-power lens, and thereby the horizontal direction curvature is larger than the vertical direction curvature as shown in the expression (3) at the progressive portion which is located further on the near portion than the progressive start point and the near portion. When the progressive-power lens is actually worn, the vertical and horizontal magnifications of an image look the same as each other in the distance portion, and the horizontal magnification of the image looks larger than the vertical magnification of the image in the progressive portion which is located further on the near portion than the progressive start point and the near portion. Therefore, since the horizontal magnification looks large in the progressive portion and the near portion, a balance between the vertical and horizontal magnifications of the image is improved, and thus distortion is reduced in the progressive portion and the near portion.

A point positioned between the progressive portion located further on the near portion than the progressive start point and the near reference point is located in the progressive portion or on the progressive portion side of the near portion. The progressive portion is a region having a continuously varied power between the distance portion and the near portion, and thus a curvature thereof is continuously varied. Since the vertical direction curvature and the horizontal direction curvature satisfy the expression (3) in this region, when an object is viewed via between the progressive portion and the near reference point, the magnification of the image in the horizontal direction becomes large, and thus it is possible to reduce distortion of the image looking long in the vertical direction in the progressive portion and the near portion.

In the progressive-power lens according to the aspect, the one surface preferably further satisfies the following expression (4).

$$CY(NP) \times CT(NP) \qquad (4)$$

In the aspect, since the horizontal direction curvature is larger than the vertical direction curvature at the near reference point, when a near object is viewed, the magnification of the image in the horizontal direction looks large, and thus it is possible to reduce distortion that the image looks long in the vertical direction in the near portion. In addition, since the magnification of an image in the horizontal direction at the near reference point becomes large, and thus the magnification of the entire image is increased, a near work is facilitated, and thereby there is an achievement of an effect that there is no fatigue even when performing the work for a long time.

In the progressive-power lens according to the aspect, a dioptric power of the distance portion is preferably a negative power.

In the aspect, the distance portion of the progressive-power lens has the negative dioptric power. In the lens having the negative dioptric power, an image is not distorted in the distance portion, but the image looks distorted so as to be long in the vertical direction in the progressive portion and the near portion. The closer to the near portion, the more noticeable the distortion. As described above, if the horizontal direction curvature is larger than the vertical direction curvature from the progressive portion of the lens to the near portion, the magnification of the image in the horizontal direction can look large. Therefore, it is possible to reduce distortion in the lens having the negative dioptric power.

In the progressive-power lens according to the aspect, preferably, the other surface of the object-side surface and the eyeball-side surface includes a distance portion having a distance reference point; a near portion having a near reference point; a progressive portion having a progressive start point provided at an end part of the distance portion side, the progressive portion being provided between the distance portion and the near portion; and a principal meridian passing through the distance reference point, the near reference point, and the progressive start point, wherein the other surface satisfies the following expressions (2) and (3)

$$CY(DP) = CT(DP) \qquad (2)$$

$$CY(P) > CT(P) \qquad (3)$$

where, in the other surface, CT(DP) denotes a vertical direction curvature at the distance reference point, CY(DP) denotes a horizontal direction curvature at the distance reference point, CY(P) denotes a horizontal direction curvature at a point on the principal meridian which is located further on the near portion than the progressive start point, and CT(P) denotes a vertical direction curvature at the point.

In the progressive-power lens according to the aspect, one surface of the object-side surface and the eyeball-side surface satisfies the expression (1), and the other surface is a corrective surface for correcting the surface power set in the one surface. According to the progressive-power lens of the aspect of the invention, it is possible to obtain a desired addition power by adjusting the surface powers of both the surfaces of the object-side surface and the eyeball-side surface. Since the curvature is also set in the other surface so as to satisfy the relationship in the expression (3), it is possible to further reduce distortion occurring from the progressive portion to the near portion.

BRIEF DESCRIPTION OF THE DRAWINGS

The invention will be described with reference to the accompanying drawings, wherein like numbers reference like elements.

FIG. 4 is a diagram illustrating the power and the curvature in the embodiment 1 of the progressive-power lens.

FIG. 8 is a diagram illustrating the power and the curvature in the embodiment 5 of the progressive-power lens.

DESCRIPTION OF EXEMPLARY EMBODIMENTS

Embodiments of the invention will be described with reference to the drawings.

Configuration of Progressive-Power Lens

Figure 1:
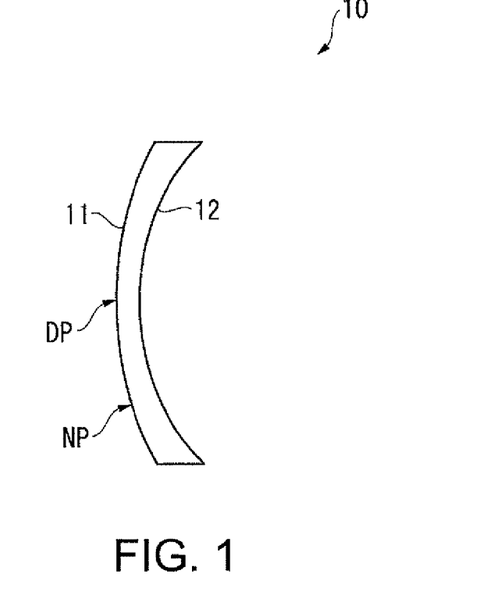
FIG. 1 is a cross-sectional view illustrating a progressive-power lens according to an embodiment of the invention.

As shown in FIG. 1, a progressive-power lens 10 is a double-sided progressive-power lens having the negative dioptric power for near vision, and includes two surfaces of an object-side surface 11 and an eyeball-side surface 12.

Figure 2:
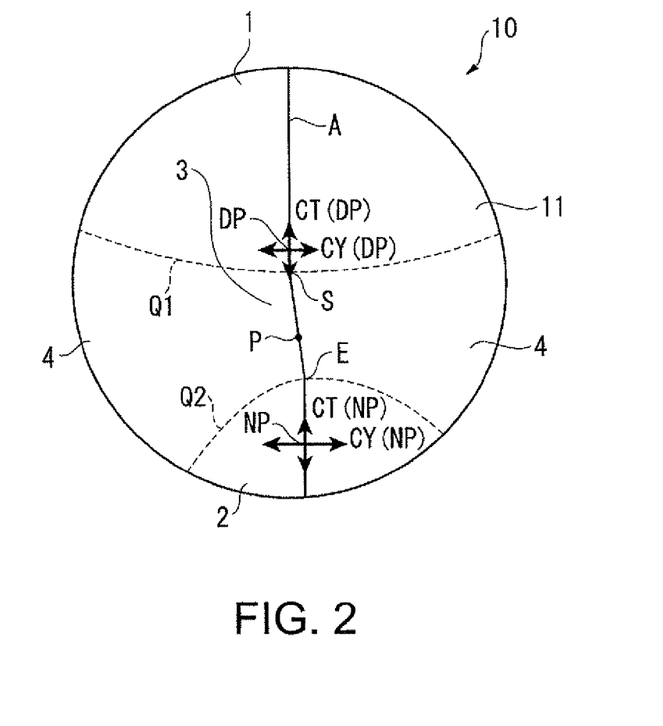
FIG. 2 is a front view illustrating the progressive-power lens.

First, a configuration of the object-side surface 11 will be described. As shown in FIG. 2, the object-side surface 11 includes a distance portion 1 having the power (dioptric power) corresponding to distance vision, a near portion 2 having the power corresponding to the near vision, a progressive portion 3 provided between the distance portion 1 and the near portion 2, and an intermediate lateral portion 4 provided on both sides of the progressive portion 3. In FIG. 2, the right part corresponds to the nose side, and the left part corresponds to the ear side. A boundary line Q1 is shown between the distance portion 1 and the progressive portion 3, and a boundary line Q2 is shown between the progressive portion 3 and the near portion 2.

A principal meridian A is provided over the distance portion 1, the progressive portion 3, and the near portion 2. The principal meridian A is a location on the lens through which the line of sight frequently passes when the lens is worn. The principal meridian A is vertically provided nearly at the central part in the distance portion 1, is provided along the principal meridian A whose upper side is provided in the distance portion 1 and is tilted toward the nose side on the way in the progressive portion 3, and is provided so as to extend vertically in the near portion 2. The principal meridian A provided in the distance portion 1 is parallel to the principal meridian A provided in the near portion 2. In the near portion 2, the principal meridian A is biased to the nose side due to the convergence when viewing a near place.

The progressive-power lens 10 has a plurality of reference points. For example, there is a progressive start point S which is an intersection between the principal meridian A and the boundary line Q1, and a progressive end point E which is an intersection between the principal meridian A and the boundary line Q2. In addition, a distance reference point DP is set at a position through which the line of sight in front vision passes on the principal meridian A in the distance portion 1. Further, a near reference point NP is set at a position through which the line of sight in near vision passes on the principal meridian A in the near portion 2. An optical center point (not shown) which is a center point of optical characteristics of the lens is set.

A progressive surface where the surface power (dioptric power) is continuously varied is located between the progressive start point S and the progressive end point E of the principal meridian A. If the surface power in the distance portion 1 is denoted by D1, and the surface power in the near portion 2 is denoted by D2, the surface power is increased from D1 to D2 on the principal meridian A from the progressive start point S to the progressive end point E, and the near portion 2 has the surface power D2 from the progressive end point E.

The surface power is set based on prescribed distance dioptric power and near dioptric power. In addition, the surface power has vertical direction power and horizontal direction power which are respectively adjusted so as to obtain desired power.

Next, the curvature set along the principal meridian A of the object-side surface 11 will be described.

The vertical direction curvature on the principal meridian A is denoted by CT, and the horizontal direction curvature on the principal meridian A is denoted by CY. If the refractive index of the lens is denoted by n, the surface power of the distance portion 1 is indicated by $(n-1) \times CT(DP)$, the surface power of the near portion 2 is indicated by $(n-1) \times CT(NP)$, and thus the addition power at the object-side surface 11 is indicated by $(n-1) \times (CT(NP)-CT(DP))$. The addition power referred to here is addition power obtained depending on the surface power. Meanwhile, if the addition power set by the prescription (prescription addition power) is denoted by Add, the addition power obtained depending on the surface power and the prescription addition power Add set by the prescription have a relationship of the following expression (1).

$$(n-1) \times (CT(NP)-CT(DP)) > \text{Add} \tag{1}$$

That is to say, the addition power obtained depending on the surface power is set to be larger than the prescription addition power Add.

Since the progressive-power lens 10 is a double-sided progressive-power lens, desired addition power is obtained by adjusting the surface power in both the object-side surface 11 and the eyeball-side surface 12. In other words, this means that the positive addition power is set according to the expression (1) in the object-side surface 11. On the other hand, as described later, the negative addition power is set in the eyeball-side surface 12 so as to generate the prescription addition power Add through combination with the addition power set in the object-side surface 11.

The progressive-power lens 10 has the vertical direction curvature CT and the horizontal direction curvature CY which are the same in the distance portion 1. If it is expressed in terms of the distance reference point DP, the following expression (2) is satisfied.

$$CY(DP) = CT(DP) \tag{2}$$

In addition, in the progressive-power lens 10, the horizontal direction curvature CY is larger than the vertical direction curvature CT in the progressive portion 3 which is located further on the near portion 2 side than the progressive start point S of the principal meridian A and the near portion 2. Specifically, if an arbitrary point on the principal meridian A which is located further on the near portion 2 side than the progressive start point S is P, the horizontal direction curvature CY is larger than the vertical direction curvature CT at the arbitrary point P. Specifically, the following expression (3) is satisfied.

$$CY(P) > CT(P) \tag{3}$$

Figure 3:
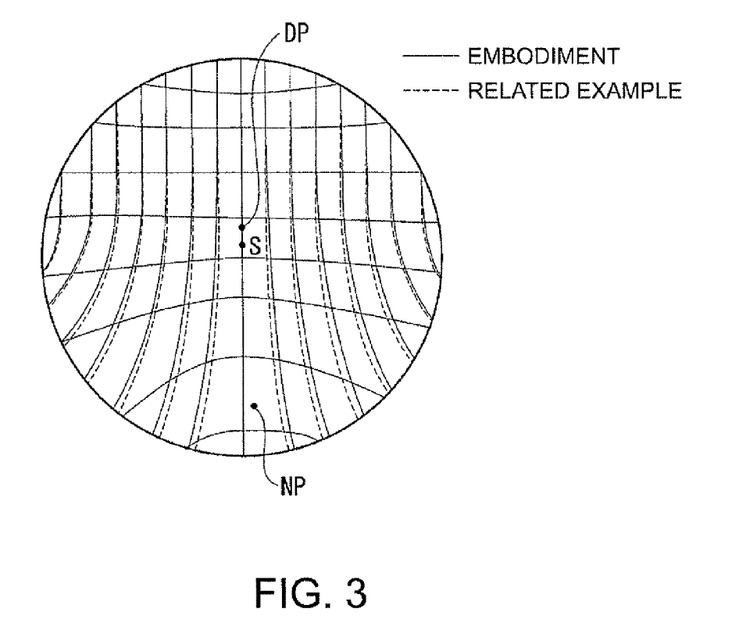
FIG. 3 is a schematic diagram illustrating a form viewed by the progressive-power lens.

As denoted by the dashed lines (related example) of FIG. 3, in the progressive-power lens 10 where the distance portion 1 has the negative dioptric power, the closer to the near portion 2 from the progressive start point S, the longer in the vertical direction an image looks distorted to be. In other words, the magnification of the image in the vertical direction looks larger than the magnification thereof in the horizontal direction.

In the expression (3), the horizontal direction curvature CY(P) is set to be larger than the vertical direction curvature CT(P) for the arbitrary point P located at the progressive portion 3 and the near portion 2. For this reason, as shown in FIG. 3, the magnification of the image (solid lines) in the horizontal direction looks larger than that of the image (dashed lines) which is viewed in the related art. In other words, the difference between the magnification in the vertical direction and the magnification in the horizontal direction of the image which is actually viewed is decreased, and thus it is possible to reduce distortion.

The relationship in the expression (3) is naturally established for the near reference point NP as shown in the expression (4).

$$CY(NP) > CT(NP) \tag{4}$$

Next, the eyeball-side surface 12 will be described. The eyeball-side surface 12 has the distance portion 1, the near portion 2, the progressive portion 3, and the intermediate lateral portion 4 in the same manner as the object-side surface 11, and each point of the principal meridian satisfies the above-described expressions (2) to (4).

The eyeball-side surface 12 is a corrective surface for the object-side surface 11, and desired power can be obtained by combining the power in the object-side surface 11 with the power in the eyeball-side surface 12. As described above, since the positive addition power is set in the object-side surface 11 as shown in the expression (1), the negative addition power is set in the eyeball-side surface 12 so as to generate the prescription addition power Add through combination with the addition power in the object-side surface 11. Since the negative addition power is set in the eyeball-side surface 12, if the spherical surface in the distance portion 1 of the eyeball-side surface 12 is used as a reference surface, the near portion 2 has a shape which is located further on the eyeball side than the reference surface.

Design Method of Progressive-Power Lens

The above-described progressive-power spectacle lens is designed according to the following procedures.

For each wearer, the surface power (dioptric power) D1 of the distance portion 1, the surface power (dioptric power) D2 of the near portion 2, the prescription addition power Add are measured, and thereby conditional numerical values necessary to design a typical lens are prescribed in addition to optimal progressive lengths. In addition, in a state where the wearer actually wears the selected glasses frame, the distance reference point DP which is a position through which the line of sight passes when viewing a distant place, the near reference point NP which is a position through which the line of sight passes when viewing a near place, and the progressive start point S are fixed.

Next, each of the vertical direction power and the horizontal direction power of the distance reference point DP in each surface is set so as to obtain desired surface powers D1 and D2 and the prescription addition power Add through synthesis of both the surfaces of the object-side surface 11 and the eyeball-side surface 12. In addition, a simulation is performed such that the vertical direction power and the horizontal direction power set in each surface are continuously varied along the principal meridian A, and vertical direction power and horizontal direction power at each position on the principal meridian A are set. Further, the vertical direction curvature CT and the horizontal direction curvature CY at each position on the principal meridian A are obtained through a simulation so as to obtain the vertical direction power and the horizontal direction power set at each position on the principal meridian A.

A lens is processed based on the numerical values obtained in this way, and glasses are completed by installing the processed lens into a frame selected by the wearer.

EMBODIMENTS

Here, embodiments designed by the above-described design method will be described. The embodiment described below are examples where the vertical direction curvature CT and the horizontal direction curvature CY at each position on the principal meridian A are set while changing lens dioptric power, and other conditions are the same as in a lens design method in the related art.

Embodiment 1

This is an example of the case where prescribed distance dioptric power is −4.00 D, prescription addition power Add is 2.00 D, and the refractive index n of the lens is 1.662. For obtaining the prescription, the vertical direction power at the distance reference point DP (distance dioptric measurement position (D)) of the object-side surface 11 (object-side refractive surface) is 2.50 D and the horizontal direction power thereat is 2.50 D, and the vertical direction power at the near reference point NP (near dioptric measurement position (N)) is 6.00 D and the horizontal direction power thereat is 7.00 D. In addition, the vertical direction power at the distance reference point DP of the eyeball-side surface 12 (eyeball-side refractive surface) is 6.50 D and the horizontal direction power thereat is 6.50 D, and the vertical direction power at the near reference point NP is 8.00 D and the horizontal direction power thereat is 9.00 D.

Based on the above-described conditions, vertical direction curvature and horizontal direction curvature at each position on the principal meridian A are set through a simulation. A result thereof is shown in FIG. 4.

Embodiment 2

This is an example of the case where prescribed distance dioptric power is −2.00 D, prescription addition power Add is 2.00 D, and the refractive index n of the lens is 1.600. For obtaining the prescription, the vertical direction power at the distance reference point DP (distance dioptric measurement position (D)) of the object-side surface 11 (object-side refractive surface) is 4.00 D and the horizontal direction power thereat is 4.00 D, and the vertical direction power at the near reference point NP (near dioptric measurement position (N)) is 7.50 D and the horizontal direction power thereat is 8.50 D. In addition, the vertical direction power at the distance reference point DP of the eyeball-side surface (eyeball-side refractive surface) 12 is 6.00 D and the horizontal direction power thereat is 6.00 D, and the vertical direction power at the near reference point NP is 7.50 D and the horizontal direction power thereat is 8.50 D.

Figure 5:
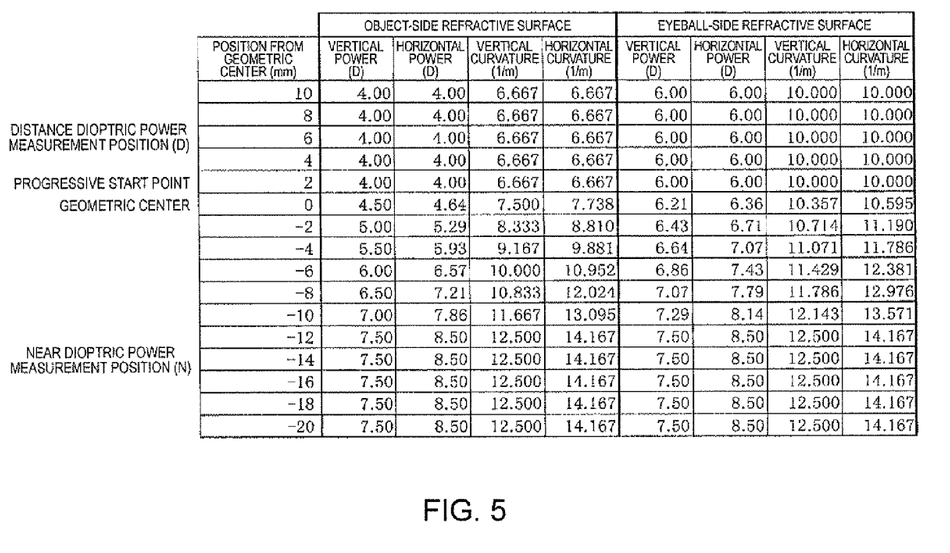
FIG. 5 is a diagram illustrating the power and the curvature in the embodiment 2 of the progressive-power lens.

Based on the above-described conditions, vertical direction curvature and horizontal direction curvature at each position on the principal meridian A are set through a simulation. A result thereof is shown in FIG. 5.

Embodiment 3

This is an example of the case where prescribed distance dioptric power is −6.00 D, prescription addition power Add is 3.00 D, and the refractive index n of the lens is 1.740. For obtaining the prescription, the vertical direction power at the distance reference point DP (distance dioptric measurement position (D)) of the object-side surface 11 (object-side refractive surface) is 1.00 D and the horizontal direction power thereat is 1.00 D, and the vertical direction power at the near reference point NP (near dioptric measurement position (N)) is 5.50 D and the horizontal direction power thereat is 7.00 D. In addition, the vertical direction power at the distance reference point DP of the eyeball-side surface 12 (eyeball-side refractive surface) is 7.00 D and the horizontal direction power thereat is 7.00 D, and the vertical direction power at the near reference point NP is 8.50 D and the horizontal direction power thereat is 10.00 D.

Figure 6:
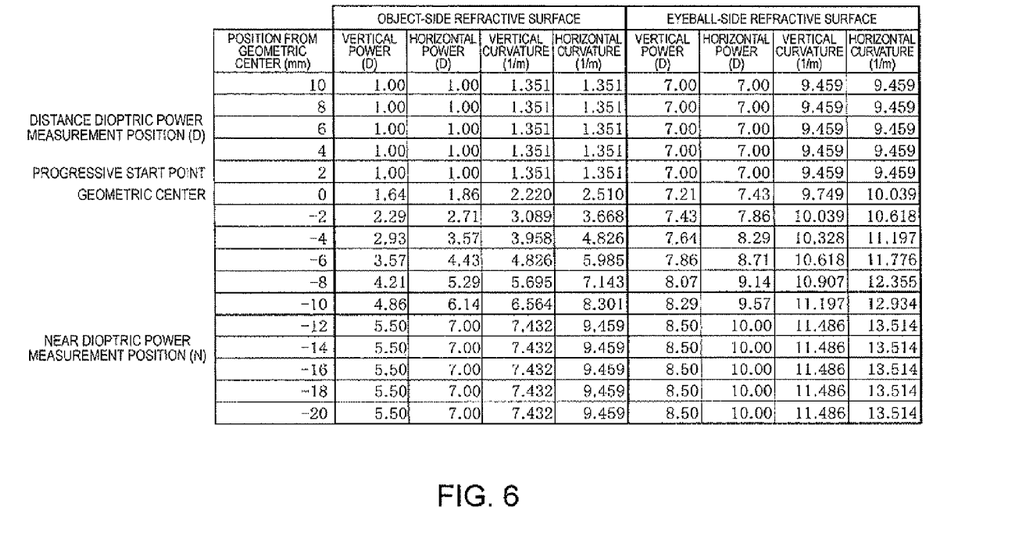
FIG. 6 is a diagram illustrating the power and the curvature in the embodiment 3 of the progressive-power lens.

Based on the above-described conditions, vertical direction curvature and horizontal direction curvature at each position on the principal meridian A are set through a simulation. A result thereof is shown in FIG. 6.

Embodiment 4

This is an example of the case where prescribed distance dioptric power is −10.00 D, prescription addition power Add is 2.50 D, and the refractive index n of the lens is 1.500. For obtaining the prescription, the vertical direction power at the distance reference point DP (distance dioptric measurement position (D)) of the object-side surface 11 (object-side refractive surface) is 0.50 D and the horizontal direction power thereat is 0.50 D, and the vertical direction power at the near reference point NP (near dioptric measurement position (N)) is 3.50 D and the horizontal direction power thereat is 5.50 D. In addition, the vertical direction power at the distance reference point DP of the eyeball-side surface 12 (eyeball-side refractive surface) is 10.50 D and the horizontal direction power thereat is 10.50 D, and the vertical direction power at the near reference point NP is 11.00 D and the horizontal direction power thereat is 13.00 D.

Figure 7:
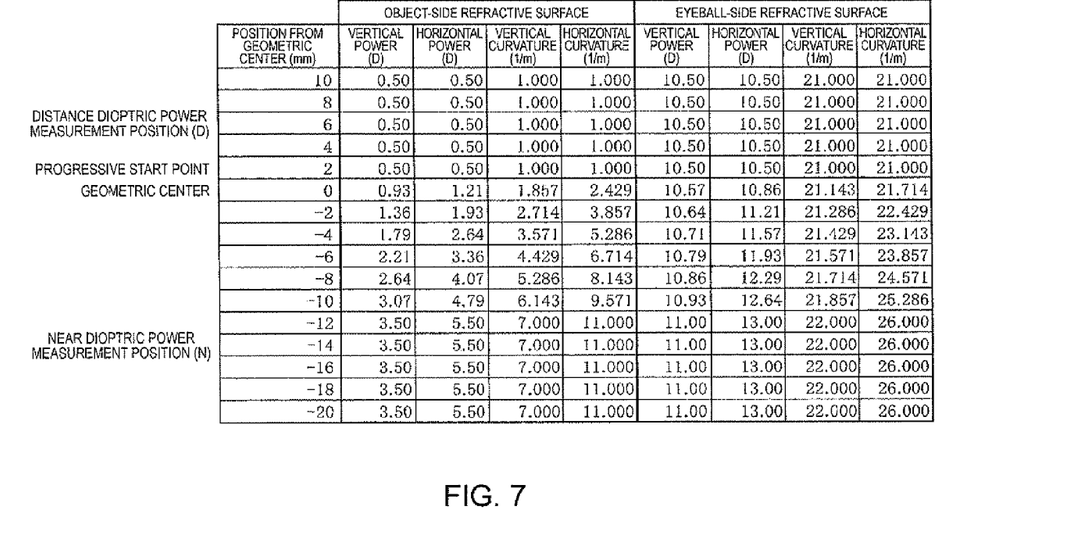
FIG. 7 is a diagram illustrating the power and the curvature in the embodiment 4 of the progressive-power lens.

Based on the above-described conditions, vertical direction curvature and horizontal direction curvature at each position on the principal meridian A are set through a simulation. A result thereof is shown in FIG. 7.

Embodiment 5

This is an example of the case where prescribed distance dioptric power is −3.00 D, prescription addition power Add is 1.00 D, and the refractive index n of the lens is 1.580. For obtaining the prescription, the vertical direction power at the distance reference point DP (distance dioptric measurement position (D)) of the object-side surface 11 (object-side refractive surface) is 3.00 D and the horizontal direction power thereat is 3.00 D, and the vertical direction power at the near reference point NP (near dioptric measurement position (N)) is 4.50 D and the horizontal direction power thereat is 5.00 D. In addition, the vertical direction power at the distance reference point DP of the eyeball-side surface 12 (eyeball-side refractive surface) is 6.00 D and the horizontal direction power thereat is 6.00 D, and the vertical direction power at the near reference point NP is 6.50 D and the horizontal direction power thereat is 7.00 D.

Based on the above-described conditions, vertical direction curvature and horizontal direction curvature at each position on the principal meridian A are set through a simulation. A result thereof is shown in FIG. 8.

As shown in FIGS. 4 to 8, the above-described expression (2) is satisfied at the distance reference point DP, and the above-described expression (3) is satisfied at the positions located further on the near portion 2 side than the progressive start point.

In an image when a square grid is viewed via the progressive-power lens of the embodiments 1 to 5 designed in this way, the magnification in the horizontal direction looks larger than that in the related art as shown in FIG. 3.

Operations and Effects of Embodiment

According to the embodiments, the following operations and effects can be achieved.

In the embodiments, the horizontal direction curvature CY(P) is larger than the vertical direction curvature CT(P) at the positions located at the lower part than the progressive start point S of the object-side surface 11 and the eyeball-side surface 12 on the principal meridian A. In the progressive-power lens 10 having the negative dioptric power, an image typically looks distorted to be vertically long in the progressive portion 3 and the near portion 2, but if the horizontal direction curvature CY(P) is larger than the vertical direction curvature CT(P) in each surface, the magnification of the image in the horizontal direction looks large. For this reason, a balance between the magnifications in the vertical direction and horizontal direction of an image which is viewed via the progressive portion 3 and the near portion 2 of the progressive-power lens 10 is improved, and thus distortion is reduced.

In addition, since the above-described expression (4) is satisfied at the near reference point NP, the magnification in the horizontal direction of a near image which is viewed via the near reference point NP looks large. Since the magnification of an image in the horizontal direction is increased, and thus the entire image looks large, a near work is facilitated, and thereby there is an achievement of an effect that there is no fatigue even for a long time.

Further, in the progressive-power lens 10, as shown in the expression (1), the surface power is adjusted such that the object-side surface 11 has the positive addition power, and the surface power is adjusted such that the eyeball-side surface 12 has the negative addition power. Since the eyeball-side surface 12 has the negative addition power, if the spherical surface in the distance portion 1 is used as a reference surface, the eyeball-side surface 12 has a shape where the near portion 2 is located further on the eyeball side than the reference surface. Therefore, since the near portion 2 is close to the eye, fluctuation is difficult to perceive. In other words, it is possible to reduce the fluctuation.

In addition, since the power of both the surfaces of the object-side surface 11 and the eyeball-side surface 12 in the progressive-power lens 10 can be adjusted, it is possible to easily obtain desired power.

The invention is not limited to the above-described embodiments, and includes modifications, alterations, and the like within the scope without departing from the spirit of the invention.

What is claimed is:

1. A progressive-power lens comprising:
an object-side surface; and
an eyeball-side surface,
wherein one surface of the object-side surface and the eyeball-side surface includes
a distance portion having a distance reference point,
a near portion having a near reference point,
a progressive portion having a progressive start point provided at an end part of the distance portion side, the progressive portion being provided between the distance portion and the near portion, and
a principal meridian passing through the distance reference point, the near reference point, and the progressive start point, and
wherein the one surface satisfies the following expressions (1) to (3)

$$(n-1) \times (CT(NP) - CT(DP)) > \text{Add} \tag{1}$$

$$CY(DP) = CT(DP) \tag{2}$$

$$CY(P) > CT(P) \tag{3}$$

where n denotes a refractive index of the progressive-power lens, Add denotes a prescription addition power of the progressive-power lens, CT(DP) denotes a vertical direction curvature at the distance reference point, CT(NP) denotes a vertical direction curvature at the near reference point, CY(DP) denotes a horizontal direction curvature at the distance reference point, CY(P) denotes a horizontal direction curvature at a point on the principal meridian which is located further towards the near portion than the progressive start point, and CT(P) denotes a vertical direction curvature at the point on the principal meridian which is located further towards the near portion than the progressive start point.

2. The progressive-power lens according to claim 1, wherein the one surface further satisfies the following expression (4)

$$CY(NP) > CT(NP) \tag{4}$$

where CY(NP) denotes a horizontal direction curvature at the near reference point.

3. The progressive-power lens according to claim 1, wherein a dioptric power of the distance portion is a negative power.

4. The progressive-power lens according to claim 1, wherein the other surface of the object-side surface and the eyeball-side surface is a corrective surface where correction for a power set in the one surface is performed, and includes a distance portion having a distance reference point;

a near portion having a near reference point;

a progressive portion having a progressive start point provided at an end part of the distance portion side, the progressive portion being provided between the distance portion and the near portion; and a principal meridian passing through the distance reference point, the near reference point, and the progressive start point, wherein the other surface satisfies the following expressions (2') and (3')

$$CY'(DP) = CT'(DP) \qquad (2')$$

$$CY'(P) > CT'(P) \qquad (3')$$

where, in the other surface, CT'(DP) denotes a vertical direction curvature at the distance reference point, CY'(DP) denotes a horizontal direction curvature at the distance reference point, CY'(P) denotes a horizontal direction curvature at a point on the principal meridian which is located further on the near portion than the progressive start point, and CT'(P) denotes a vertical direction curvature at the point on the principal meridian which is located further on the near portion than the progressive start point.

* * * * *